United States Patent [19]

Moon

[11] Patent Number: 5,918,024

[45] Date of Patent: *Jun. 29, 1999

[54] METHOD AND APPARATUS FOR PROVIDING SINGLE CHANNEL COMMUNICATIONS

[75] Inventor: Billy Gayle Moon, Apex, N.C.

[73] Assignee: Ericsson, Inc., Research Triangle Park, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/646,484

[22] Filed: May 8, 1996

[51] Int. Cl.$^6$ .................................................. G06F 13/00
[52] U.S. Cl. .......................... 395/286; 395/843; 395/884; 395/307
[58] Field of Search ..................... 395/286, 843, 395/200.01, 325, 275, 250, 884, 307; 364/514, 200; 370/95, 92; 178/58; 101/248

[56] References Cited

U.S. PATENT DOCUMENTS

| | | | |
|---|---|---|---|
| 3,715,496 | 2/1973 | Jones, Jr. ................................. | 178/58 |
| 4,740,957 | 4/1988 | Cassidy et al. ........................... | 370/92 |
| 4,817,089 | 3/1989 | Paneth et al. ............................. | 370/95 |
| 4,949,333 | 8/1990 | Gulick et al. . | |
| 5,045,675 | 9/1991 | Curry ..................................... | 235/441 |
| 5,119,319 | 6/1992 | Tanenbaum ............................. | 364/514 |
| 5,140,679 | 8/1992 | Michael ................................. | 395/325 |
| 5,175,766 | 12/1992 | Hamilton ................................ | 380/49 |
| 5,179,661 | 1/1993 | Copeland, III et al. ................ | 395/250 |
| 5,199,105 | 3/1993 | Michael ................................. | 395/275 |
| 5,245,553 | 9/1993 | Tanenbaum ............................. | 364/514 |
| 5,287,458 | 2/1994 | Michael et al. ......................... | 395/250 |
| 5,349,635 | 9/1994 | Scott ....................................... | 379/97 |
| 5,509,126 | 4/1996 | Oprescu et al. ........................ | 395/307 |
| 5,564,061 | 10/1996 | Davies et al. ........................... | 395/884 |
| 5,732,625 | 3/1998 | Klinger et al. .......................... | 101/248 |

FOREIGN PATENT DOCUMENTS

| | | |
|---|---|---|
| 0 666 529 A1 | 1/1995 | European Pat. Off. . |
| WO 90/04296 | 4/1990 | WIPO . |

OTHER PUBLICATIONS

Communications Chip Interfaces With Most Microprocessors by Sam Travis, National Semiconductor Corp., Santa Clara, California Electronics, Mar. 16, 1978.

INWAS: Interfacing With Asynchronous Serial Node by David G. Larsen, Peter R. Rony and Jonathan A. Titus, IEEE Transactions On Industrial Electronics and Control Instrumentation, vol., IECI–24, No. 1, Feb. 1977.

*Primary Examiner*—Ayaz R. Sheikh
*Assistant Examiner*—Eric S. Thlang
*Attorney, Agent, or Firm*—Jenkins & Gilchrist, P.C.

[57] ABSTRACT

A UART including a logic unit is disclosed, wherein the logic unit automatically enables or disables the UART receiver port whenever data is being processed by the UART for wireless transmission. More specifically, a logic unit is connected to a data store, to a transmit FIFO and to a UART processing unit as well as to an external CPU, wherein the logic unit analyzes the logic states of each of the signals from each of the specified connections to determine whether to enable or disable the receiver unit. An inventive method is also disclosed wherein the logic unit only enables the receiver when the data store is empty and the transmitter FIFO is empty and a receiver enable flag is set to true and a half duplex mode of operation has been specified by an external CPU. Otherwise, the logic enables the receiver only when a full duplex mode of operation has been specified and the receiver enable flag is set to a logic one.

10 Claims, 4 Drawing Sheets

METHOD AND APPARATUS FOR PROVIDING SINGLE CHANNEL COMMUNICATIONS

CROSS REFERENCES TO RELATED APPLICATIONS

DESCRIPTION

1. Technical Field of the Invention

This invention relates to wireless communications and, more specifically, to bi-directional communications utilizing only one communications channel.

2. Description of Related Art

A known problem relating to wireless single channel communications is that of undesirable reception in the receiver portion of the signal transmitted by the transmitter of the same device or system. One approach which has been used to avoid this problem of undesired reception, is to transmit a signal in one channel and to receive a response in a different channel. However, based upon the technology, it is sometimes impractical or impossible to use different channels for transmitting and receiving signals.

Another approach for preventing signal processing of undesired receptions is to transmit a portion of data and then to delete an equivalent amount of data which was received very shortly after the transmission of the data. Such an approach, however, can become quite complicated in that a device must keep track of the timing of data transmissions so that it can determine what received data requires erasing or flushing.

The use of digital signal formats for transmitting data simplifies the problem of flushing data. The reason, of course, is that the exact amount of data which is transmitted is known and therefore an equivalent amount may be deleted. By way of example, a device may determine that N number of bytes was transmitted. Accordingly, and prior to the receipt of a response from another device, a current device must delete the last N number of bytes received. As may be seen, with this embodiment, a device is allowed to receive the data it transmits, but, by careful data management, such data may be deleted before real data is received from another device. A challenge with implementing this system, however, is that the received data must be deleted quickly so as to not interfere with the reception of actual signals being transmitted by another device.

One type of device which suffers from the above problems, is an infrared transmitter/receiver which produces non-coherent light, namely light which tends to diverge rather than follow a straight path. In a device which utilizes a known infrared digital signal protocol, such as INFRA-RED DIGITAL ASSOCIATION (IrDA), transmission and reception of the signals occurs over the same "channel" because signals transmitted in the spectral frequency domain cannot be separated into a plurality of channels as readily as can other electromagnetic signals from other spectrums, such as VHF or UHF. Thus, when non-coherent light is used as a signal medium, the transmitted signal is frequently received by the optical filters of the same system or device. Accordingly, single channel infrared systems are usually adapted to purge data received after every transmission since the received signal is the very signal which was transmitted.

As was stated before, however, a difficulty with purging undesired received signals transmitted by the same device's infrared transmitter is that the response time for purging data is very small because the receiver must be ready to receive an immediate response from another unit.

Thus, in those systems which utilize a light emitting diode (LED) and which include light detectors as receivers, or any other type of wireless single channel communication, the problem of receiving a device's own transmission is real. What is needed, therefore, is an apparatus and method which prevents a device's own receiver from receiving the signals it transmits in a way which requires less processing resources and which utilizes even less time to implement, and therefore, reduces the risk of missing an initial part of a block of data which is transmitted in response by another device.

SUMMARY OF THE INVENTION

An apparatus and method is disclosed, wherein bi-directional communications are being performed in a single channel of communication which avoids unnecessary processing and allows a more efficient data transmission process in a single channel environment. The inventive apparatus includes logic circuitry that automatically disables and enables the receiver port of the UART in a manner which avoids the UART the reception of data transmitted by a device's own transmitter. By employing such logic circuitry, at least two specific advantages are recognized.

First, software interrupt handling that occurs whenever data is received by a receiver part of a UART, and which must be processed, are no longer being generated and processed due to the unnecessary reception of data which was transmitted by the UART's own transmitter. This dramatically reduces the number of unnecessary software interrupts that must be processed. Second, because UARTs frequently must be prepared to receive a nearly immediate response from another system within a small and finite amount of time, the purging of undesired data to within the real time constraints is no longer a problem because there is no longer a need to purge such data. The disclosed apparatus and method herein circumvents the timing constraints of a real time system in which unwanted data must be purged quickly by utilizing a circuit and method which automatically disables the receiver while transmissions are occurring and which enables the receiver to receive when transmissions cease to occur.

In one embodiment, a UART control circuit within a UART is disclosed in which the UART control circuit includes an input for receiving a half duplex mode signal. The UART control circuit causes the UART to operate in a half duplex mode of operation when a half duplex mode of operation indication is received. While in a half duplex mode of operation, the UART disables the receiver whenever at least one signal received at least one input, indicates that there is data for the UART to transmit.

The UART control circuit in one embodiment, includes inputs from a FIFO register set and from a data store, indicating whether there is data therein, respectively, for transmission by the UART. The logic unit also includes an input from a processing unit indicating whether a standard UART receiver enable flag has been set. The UART control circuit also includes an input to receive the half duplex enable mode signal discussed above. The UART receiver is enabled, then, whenever a half duplex mode of operation has been specified, and the transmitter FIFO and the transmitter data store are both empty. The receiver is also enabled if the half duplex mode of operation is not being specified. Otherwise, the receiver is disabled.

The inventive method includes disabling the receiver if the Receiver Enable Flag is not set by the process unit. If the Receiver Enable Flag is set, then the receiver is enabled either if the half duplex mode of operation is not being specified by an external processor or if the transmitter data store and FIFO register sets are both empty. The receiver is disabled, otherwise, if a half duplex mode of operation is specified and either the transmitter data store or FIFO register set are not empty.

BRIEF DESCRIPTION OF THE DRAWINGS

A more complete understanding of the method and system of the present invention may be obtained by reference to the following Detailed Description of the preferred embodiment(s) that follow, taken in conjunction with the accompanying drawings, wherein.

DESCRIPTION OF THE PREFERRED EMBODIMENT

Figure 1:
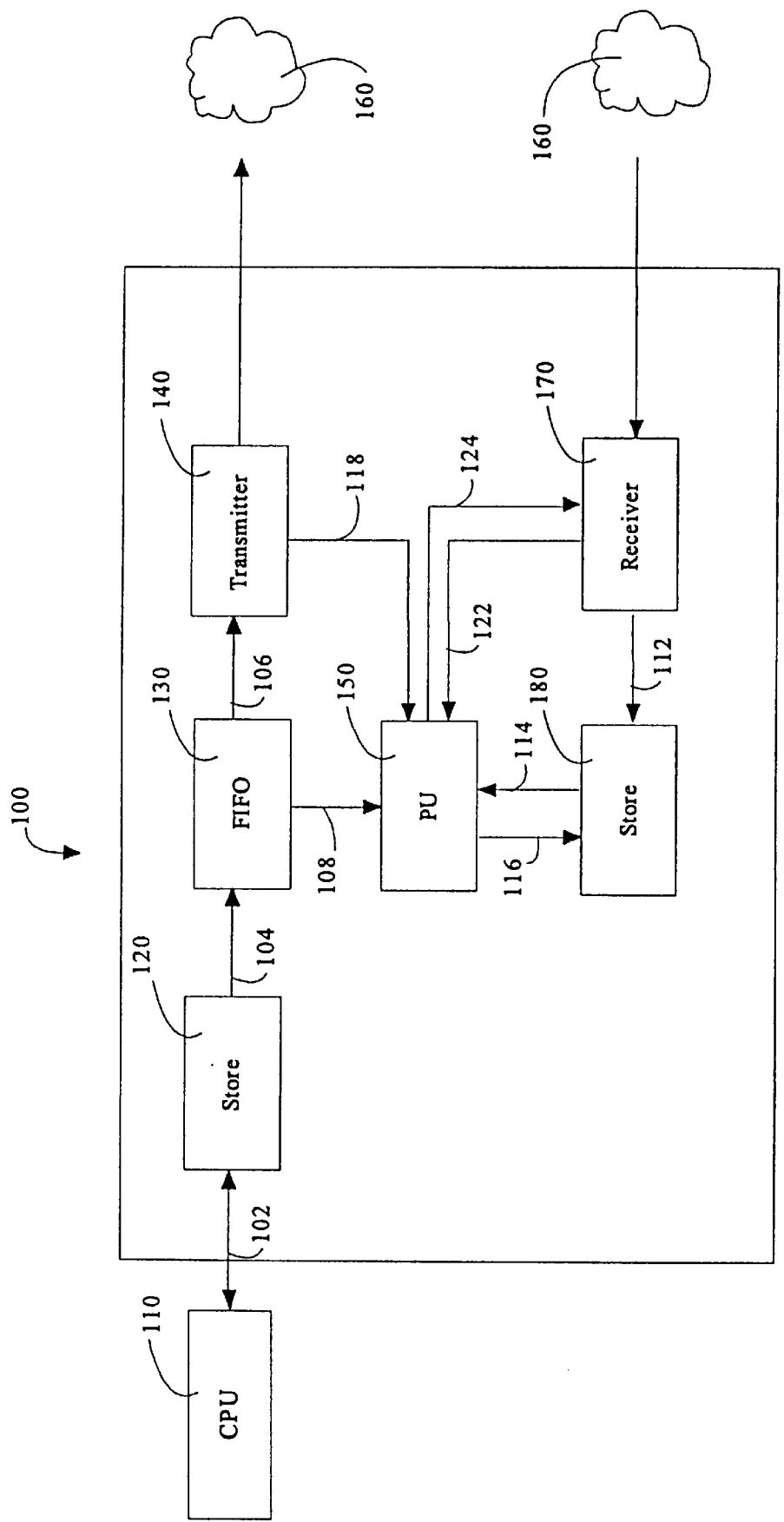
FIG. 1 is a block diagram representing an exemplary embodiment of a UART.

Referring now to FIG. 1, there is shown an exemplary embodiment of a UART 100 which is coupled to a CPU 110 by data bus 102. As may be seen, a transmit data store 120 acts as a data queue for data to be transmitted by transmitter 140. A transmit FIFO 130 is connected between data store 120 and transmitter 140 by lines 104 and 106, respectively. FIFO 130 provides to UART processing unit 150 a signal reflecting whether the FIFO 130 contains data for transmission over line 108. Whenever transmitter 140 transmits a signal 160, which signal is received by receiver 170, receiver 170 transmits the signal to store 180 over line 112. Store 180 then indicates to processing unit 150, over line 114, that it has received a data block from receiver 170. Processing unit 150, then, responds by commanding store 180, over line 116, to delete such data block. Typically, processing unit 150 will instruct store 180 to delete a data block whenever such a data block is received as a signal a very short time after transmitter 140 transmitted a signal 160. More specifically, transmitter 140 generates an interrupt which is transmitted to processing unit 150 over line 118 every time it transmits signal 160. Similarly, receiver 170 generates an interrupt which it transmits to processing unit 150 over line 122 every time it receives a signal 160. As may be seen, therefore, processing unit 150 must process an interrupt received from receiver 170 every time transmitter 140 transmits a signal 160, because the same signal is received by receiver 170. It also should be mentioned that PU 124 sends to receiver 170 a receiver enable flag over line 124 which allows receiver 170 to receive signals. Generally, this receiver enable flag is set on line 124 when transmitter 140 is transmitting as well as when transmitter 140 is not transmitting but the system is powered on.

The use of a digital signal format simplifies the problem of flushing signals, as described above. The reason, of course, is that the exact amount of data which is transmitted is known and therefore an equivalent amount may be deleted. By way of example, a device may determine that N number of bytes was transmitted. Accordingly, and prior to the receipt of a response from another device, a current device must delete the last N number of bytes received. As may be seen, with this embodiment, a device is allowed to receive the data it transmits, but, by careful data management, such data may be deleted before real data is received from another device. A challenge with implementing this system, however, is that the received data must be deleted quickly to not interfere with the reception of actual signals being transmitted by another device.

Figure 2:
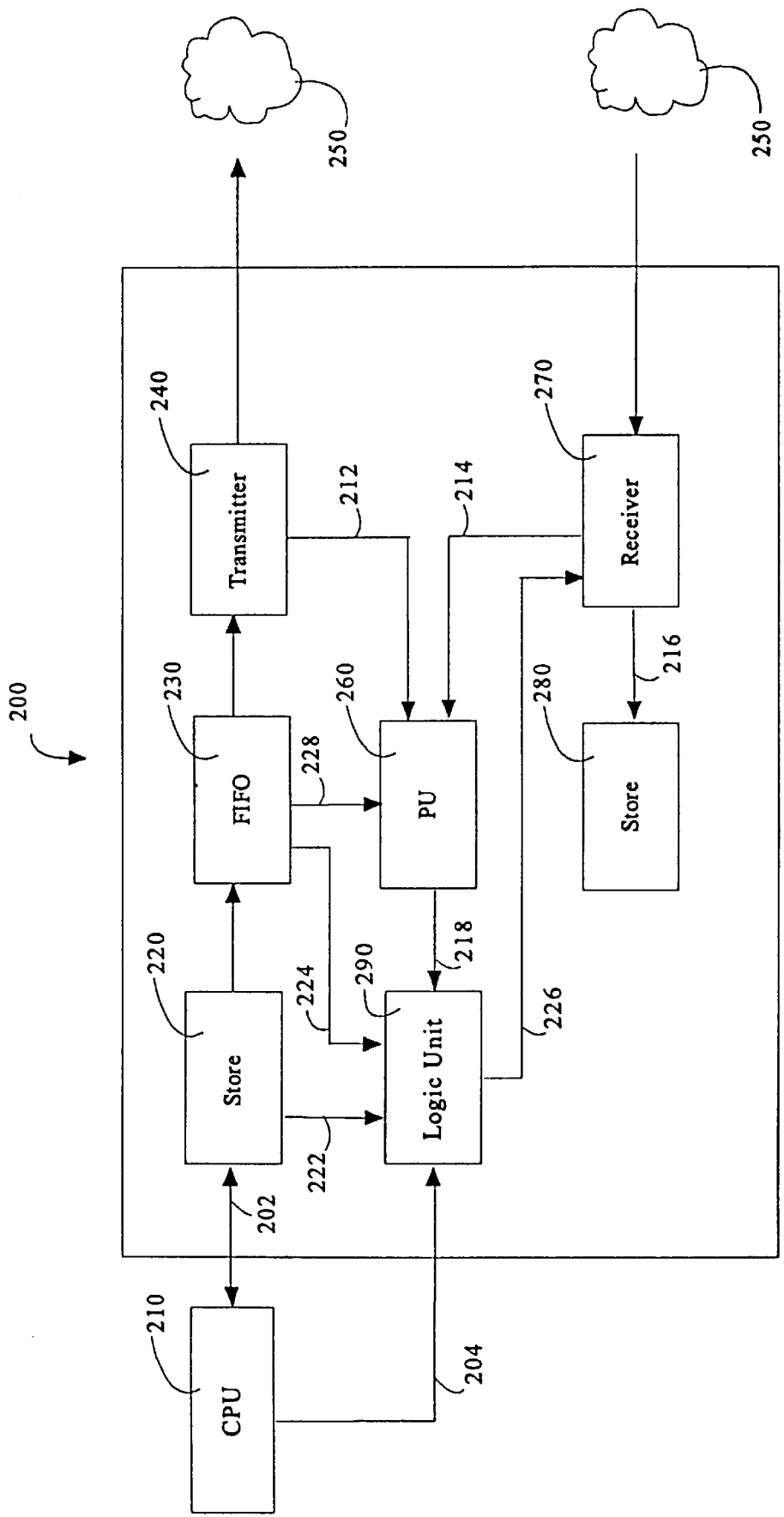
FIG. 2 is a block diagram representing an exemplary embodiment of a UART including a logic circuit.

FIG. 2 shows a block diagram of a UART including a logic circuit. Specifically, UART 200 is connected to external CPU 210 by data bus 202 and by mode control line 204. Transmit data store 220 is connected to transmit FIFO 230 by line 206. Transmit FIFO 230 is also connected to transmitter 240 by line 208. Thus, when UART 200 receives data for transmission from CPU 210 over data bus 202, transmit data store 220 initially acts as a data queue for storing the data to be transmitted. Then, transmit data store 220 transmits to transmit FIFO 230 the data which is to be transmitted by transmitter 240. Transmit FIFO 230, as is known in the art, acts to assist with the timing of data transmissions by transmitter 240. As may be seen, whenever transmitter 240 receives a byte of data from transmit FIFO 230 over line 208, it transmits such byte of data as signal 250. Also, transmitter 240 which is also coupled to processing unit 260 by line 212 transmits to processing unit 260 a software interrupt over line 212 to indicate that a data byte has been transmitted.

Similarly, whenever receiver 270 receives a signal 250, it generates a software interrupt which software interrupt is transmitted to processing unit 260 over line 214. Receiver 270 also transmits the received signal to receive data store 280 over line 216.

In the UART of FIG. 1, as was discussed before, processing unit 150 transmits a receiver enable flag to receiver 170 over line 124. This receiver enable flag is used to enable or disable the receiver. Generally, the receiver enables the flag to set logic 1 regardless of whether the UART is transmitting or receiving signals. In the embodiment of the invention shown in FIG. 2, however, the receiver enable flag is transmitted to logic unit 290 over line 218 instead of being transmitted to the receiver, as in the prior art. Logic unit 290 also receives as input a signal over line 222 which indicates whether transmit data store 220 is empty and a signal over line 224 which indicates whether transmit FIFO 230 is empty. According to a logic state of each of the signals received over lines 222, 224, 218 and over mode control line 204, logic unit 290 determines whether to enable or disable receiver 270 over line 226.

In the embodiment of FIG. 2, logic unit 290 enables receiver 270 to receive a signal 250 only when a receiver enable flag is set to true on line 218 as well as when the signal on mode control line 204 reflects full duplex mode of operation rather than half duplex or, if it reflects a half duplex mode of operation, the signals received on lines 222 and 224 indicate that transmit data store 220 and transmit FIFO 230 are empty, respectively. Thus, by way of example, if the receiver enable flag received on line 218 is set to true and the mode control line 204 reflects that a half duplex mode of operation has been enabled, receiver 270 will only be enabled to receive a signal 250 by logic unit 290 over line 226 whenever transmit data store 220 and transmit FIFO 230 are both empty as indicated over lines 222 and 224. Thus, whenever UART 200 is in a transmit mode of operation, as indicated by either data store 220 or transmit FIFO 230 having data therein for immediate transmission, receiver 270 is automatically disabled if a half duplex mode of operation has been specified over line 204 by external CPU 210.

The UART 200 of FIG. 2 shows a processing unit 260 that is contained within the UART 200. Such processing unit 260 could, just as readily, have its functionality performed by CPU 210. In such an embodiment, each of the lines carrying signals to processing unit 260 would merely carry those signals to external CPU 210 for processing by it.

Figure 3:
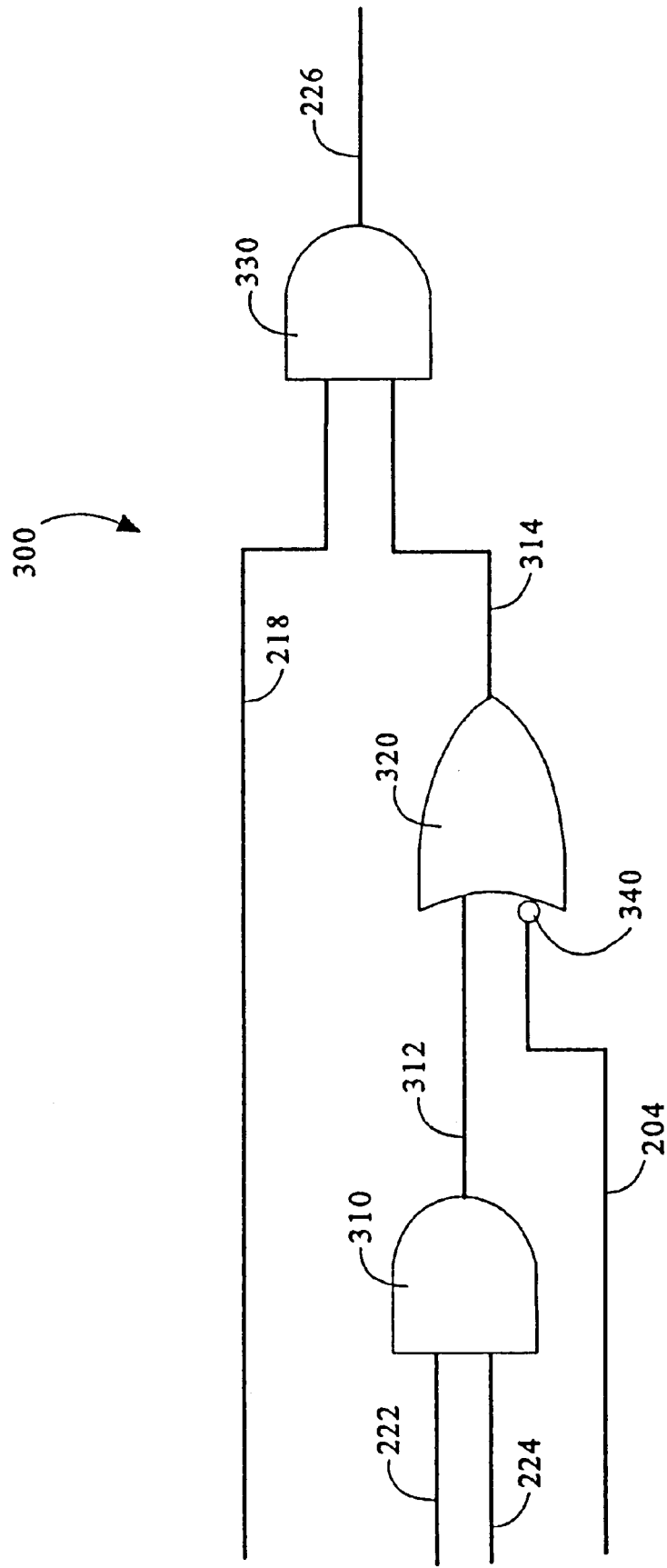
FIG. 3 is a logic diagram illustrating the logic components and their connections of one embodiment of the logic circuit of the invention herein.

Referring now to FIG. 3, there is shown a logic diagram of one embodiment of logic unit 290 of FIG. 2. As may be seen, logic unit 300 of FIG. 3 is comprised of an AND gate 310, an OR gate 320, and a second AND gate 330. The two inputs of AND gate 310 receive the signals carried on lines 222 and 224 from the transmit data store 220 and transmit FIFO 220, all of FIG. 2, which signals reflect whatever data store 220 and whether transmit FIFO 230 are empty, respectively. A logical output of AND gate 310 is transmitted to one input of OR gate 320 by line 312. The half duplex mode of operation signal, which is carried from CPU 210 to UART 200 over line 204 of FIG. 2, is coupled to an inverter 340 which inverts the state of the signal prior to the signal being transmitted to the second input of OR gate 320. The logical output of OR gate 320, is then transmitted to one input of AND gate 330 over line 314. As may be seen, AND gate 330 includes two inputs, one which is the output of OR gate 320 and one input on line 218 of FIG. 2 which receives the Rx enable flag. The output of AND gate 330, an Rx Enable Signal, is transmitted on line 226 of FIG. 2 to receiver 270 to enable or disable receiver 270. As may be seen, receiver 270 is only enabled by the logic unit depicted in FIG. 3, according to the following logical expression:

Rx Enable=((Data Store Empty AND Transmit FIFO Empty) OR Half Duplex Disable) AND Rx Enable Flag It is understood, of course, that the above expression as well as the circuit of FIG. 3 may have many logical equalivents that achieve similar results. For example, a half duplex disable signal is equal to the opposite of a half duplex enable signal. One skilled in the art can readily appreciate the invention being taught herein and how to derive equivalent logical circuits and expressions.

Figure 4:
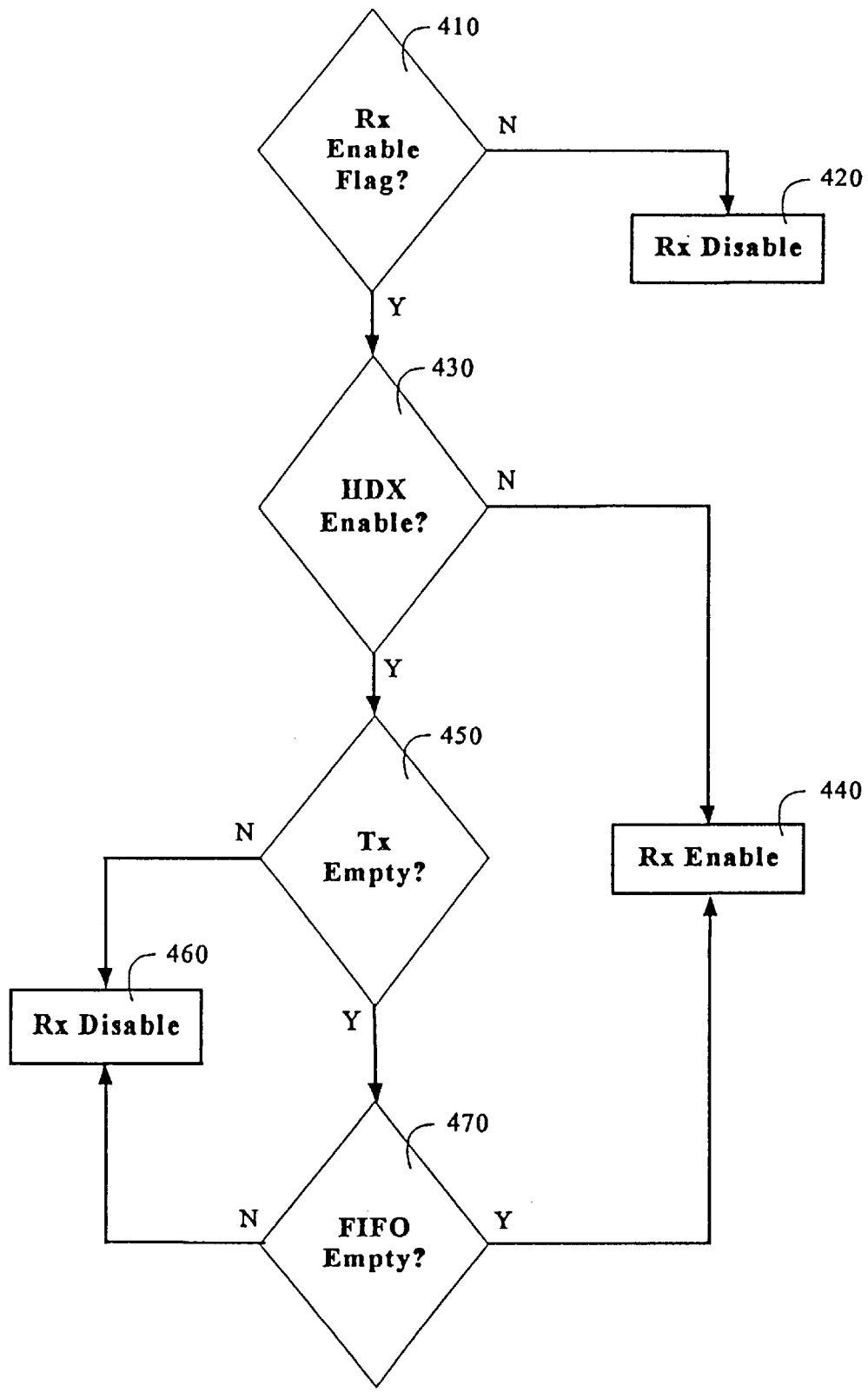
FIG. 4 is a flow chart illustrating one embodiment of the logic flow of the inventive methods herein.

Referring now to FIG. 4, there is shown one embodiment of the inventive methods. Step 410 includes determining whether the Rx enable flag has been set. If not, as is shown in step 420, the receiver is disabled. If the Rx enable flag is set, then step 430 includes determining whether the half duplex mode of operation has been specified. If not, the receiver is enabled, as shown in step 440. If a half duplex mode of operation has been specified, however, then the inventive method includes determining whether the transmit data store is empty as is shown in step 450. If the data store is not empty, the receiver disabled in step 460. However, if the transmitter data store is empty, then the inventive method includes determining whether the transmit FIFO is empty as shown in step 470. If the transmit FIFO is not empty, the receiver is disabled as shown in step 460. If the transmit FIFO is empty, however, the receiver is enabled as shown in step 440. As may readily be appreciated by one skilled in the art, however, the above steps may be followed in a different order without departing from the invention. By way of example, step 470 could precede step 450. In another example, step 410 could be performed last.

Based upon the foregoing, those skilled in the art should now fully understand that the present invention provides an apparatus and method which significantly reduces software interrupt processing and reduces processor workload. The advantages of the invention, based upon the foregoing, also includes faster UART readiness for receiving a response from another system, and, therefore, having a lower likelihood that incoming signals will not be received.

Although a preferred embodiment of the method and apparatus of the present invention has been illustrated in the accompanying drawings and described in the foregoing detailed description, it will be understood that the invention is not limited to the embodiment disclosed, but is capable of numerous rearrangements, modifications and substitutions without departing from the spirit of the invention as set forth and defined by the following claims.

What is claimed is:

1. A UART capable of operating in both full duplex and half duplex mode for providing single channel communications, comprising:

a transmitter for transmitting signals on a single communications channel;

a receiver for receiving signals on the single communications channel;

processing means for indicating whether the UART is operating in a full duplex mode of operation; and receiver control circuitry for disabling the receiver in response to the indication of a full duplex mode of operation by the processing means.

2. The UART of claim 1 further comprising means for storing data to be transmitted by the transmitter, the means for storing generating a signal indicating when data for transmission is contained therein.

3. The UART of claim 2 wherein the receiver control circuitry further disables the receiver in response to the signal indicating data for transmission in the means for storing.

4. The UART of claim 2 wherein the means for storing further comprises:

a data store for queuing data to be transmitted by the transmitter; and a FIFO for passing data between the data store and the transmitter.

5. The UART of claim 4 wherein the receiver control circuitry disables the receiver in response to signals indicating data stored within the data store and the FIFO.

6. The UART of claim 1 wherein the receiver control circuitry further disables the receiver in response to the indication of whether the receiver enable flag has been set.

7. An apparatus for providing single channel communications, comprising:

a transmitter for transmitting signals on a single communications channel;

a receiver for receiving signals on the single communications channel;

processing means for generating an indication of at least one of whether the apparatus is in a full-duplex mode and whether a receiver enable flag is set;

means for storing data to be transmitted by the transmitter, the means for storing generating an indication when data for transmission is contained therein; and receiver control circuitry for disabling the receiver in response to at least one of the indications of whether the apparatus is in a full duplex mode, the indication of whether the receiver enable flag is set and the indication of whether the means for storing contains data for transmission.

8. The apparatus of claim 7 wherein the means for storing further comprises:

a data store for queuing data to be transmitted by the transmitter; and a FIFO for passing data between the data store and the transmitter.

9. The apparatus of claim 8 wherein the receiver control circuitry disables and enables the receiver in response to signals indicating data within the data store and the FIFO.

10. A control circuit for a UART, comprising:

means for receiving at least one of a first indicator of whether the UART operates in a full-duplex mode, a second indicator of whether a receiver flag is set, a third indicator of whether data for transmission is stored; and control circuitry for completely disabling a receiver responsive to at least one of the first, second and third indicators.

* * * * *

UNITED STATES PATENT AND TRADEMARK OFFICE
CERTIFICATE OF CORRECTION

| | | |
|---|---|---|
| PATENT NO. | : 5,918,024 | Page 1 of 1 |
| APPLICATION NO. | : 08/646484 | |
| DATED | : June 29, 1999 | |
| INVENTOR(S) | : Billy Gayle Moon | |

It is certified that error appears in the above-identified patent and that said Letters Patent is hereby corrected as shown below:

Col. 6, line 8, Delete claim 1 and substitute the following amended claim 1 therefor:

--1. A UART capable of operating in both full duplex and half duplex mode for providing single channel communications, comprising:
  a transmitter for transmitting signals on a single communications channel;
  a receiver for receiving signals on the single communications channel;
  processing means for indicating whether the UART is operating in a full duplex mode of operation or whether a receiver enable flag has been set; and
  receiver control circuitry for disabling the receiver in response to at least one of the indication of a full duplex mode of operation and the indication of the setting of the receiver enable flag by the processing means.--

Signed and Sealed this

Sixth Day of February, 2007

JON W. DUDAS
*Director of the United States Patent and Trademark Office*